United States Patent
Magdassi et al.

(10) Patent No.: US 8,227,022 B2
(45) Date of Patent: Jul. 24, 2012

(54) METHOD OF FORMING AQUEOUS-BASED DISPERSIONS OF METAL NANOPARTICLES

(75) Inventors: Shlomo Magdassi, Jerusalem (IL); Alexander Kamyshny, Jerusalem (IL); Shai Aviezer, Merkaz (IL); Michael Grouchko, Jerusalem (IL)

(73) Assignee: Yissum Research Development Company of The Hebrew University of Jerusalem, Jerusalem (IL)

( * ) Notice: Subject to any disclaimer, the term of this patent is extended or adjusted under 35 U.S.C. 154(b) by 1102 days.

(21) Appl. No.: 11/813,628

(22) PCT Filed: Jan. 10, 2006

(86) PCT No.: PCT/IL2006/000031
§ 371 (c)(1),
(2), (4) Date: Apr. 17, 2008

(87) PCT Pub. No.: WO2006/072959
PCT Pub. Date: Jul. 13, 2006

(65) Prior Publication Data
US 2009/0214766 A1     Aug. 27, 2009

Related U.S. Application Data

(60) Provisional application No. 60/642,116, filed on Jan. 10, 2005.

(51) Int. Cl.
*B05D 5/12*     (2006.01)
*B29B 15/00*     (2006.01)
*C23C 18/00*     (2006.01)
*C01F 7/34*     (2006.01)
*C22B 13/00*     (2006.01)
*H01B 1/02*     (2006.01)
*H01B 1/22*     (2006.01)

(52) U.S. Cl. ....... 427/123; 427/98.4; 427/125; 977/773; 977/810; 252/512; 252/514; 23/305 R

(58) Field of Classification Search ..................... None
See application file for complete search history.

(56) References Cited

U.S. PATENT DOCUMENTS
5,550,150 A     8/1996    Fontana
(Continued)

FOREIGN PATENT DOCUMENTS
EP     0911859 A     4/1999
(Continued)

OTHER PUBLICATIONS

Curtis et al., "Metallizations by direct-write inkjet printing." D. Proc. of the NCPV Program Review meeting. 2001, pp. 249-252, Lakewood, Colorado, USA.*

(Continued)

*Primary Examiner* — Christina Johnson
*Assistant Examiner* — Benjamin Schiffman
(74) *Attorney, Agent, or Firm* — Browdy and Neimark, PLLC

(57) ABSTRACT

The invention relates to a method for preparing an aqueous-based dispersion of metal nanoparticles comprising: (a) providing an aqueous suspension of a metal salt; (b) pre-reducing the metal salt suspension by a water soluble polymer capable of metal reduction to form a metal nuclei; and (c) adding a chemical reducer to form metal nanoparticles in dispersion. The invention further relates to aqueous-based dispersions of metal nanoparticles, and to compositions such as ink comprising such dispersions.

37 Claims, 4 Drawing Sheets

U.S. PATENT DOCUMENTS

| | | | |
|---|---|---|---|
| 5,621,449 | A | 4/1997 | Leenders et al. |
| 6,261,479 | B1 | 7/2001 | Yukinobu et al. |
| 7,445,731 | B2 | 11/2008 | Okada et al. |
| 2004/0147618 | A1* | 7/2004 | Lee et al. ............ 516/78 |

FOREIGN PATENT DOCUMENTS

| | | |
|---|---|---|
| EP | 1571186 A | 9/2005 |
| JP | 11080647 A | 3/1999 |
| WO | 03038002 A | 5/2003 |

OTHER PUBLICATIONS

Ryu, et al.,"Synthesis of highly concentrated silver nanoparticles assisted polymeric dispersant," Key Engineering Materials, 2004, pp. 141-142.

Ryu, et al.,"Printability of synthesized silver nano sol in micro-patterning of electrode on ITO glass," Asia display/IMID 04 Proceedings, 2004, pp. 1-4.

Sondi, et al.,"Preparation of highly concentrated stable dispersions of uniform silver nanoparticles," Journal of colloid and interface science, 2003, pp. 75-81, vol. 260.

Goia et al.,"Preparation of monodispersed metal particles," New J. Chem, 1998, pp. 1203-1215.

Vest et al.,"Ink jet printing of hybrid circuits," R.C. Int. J. Hybrid Microelectron, 1983, pp. 261-267, vol. 6.

Teng et al.,"A microprocessor-Controlled ink jet printing system for electronic circuits," IEEE Trans. Indust. Electron., 1988, pp. 407-412, vol. 35, No. 3.

Teng et al.,"Application of ink jet technology on photovoltaic metallization," IEEE Electron. Device Lett., 1988, pp. 591-593, vol. 9, No. 11.

Fuller et al.,"Ink-jet printed nanoparticle microelectromechanical systems," J.M.J. Microelectromech. Syst., 2002, vol. 11, No. 1.

Deegan et al.,"Capillary flow as the cause of ring stains from dried liquid drops," Letter to Nature, 1997, pp. 827-829, vol. 389, Macmillan.

* cited by examiner

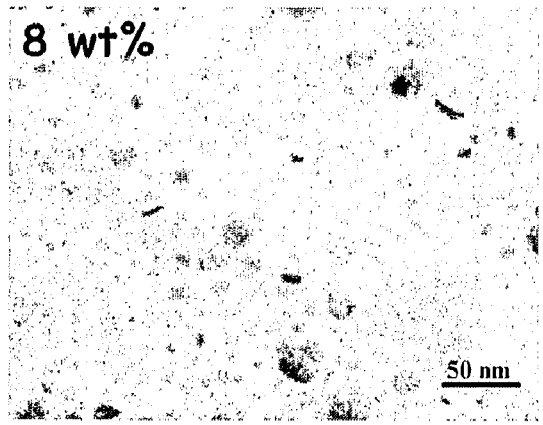
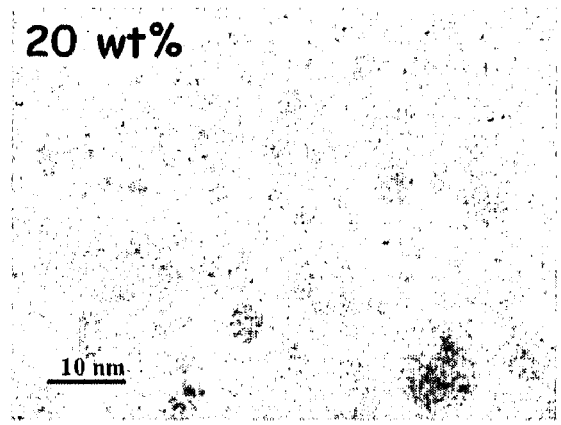
FIG. 1A          FIG. 1B
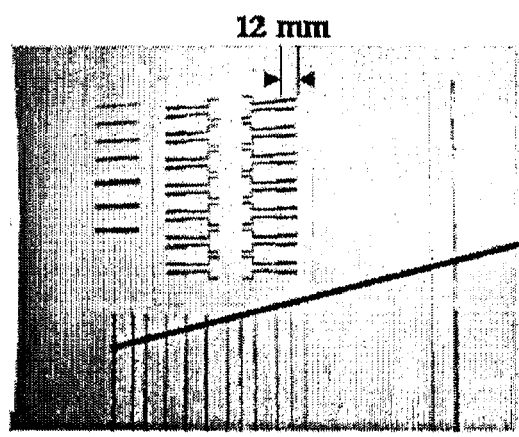
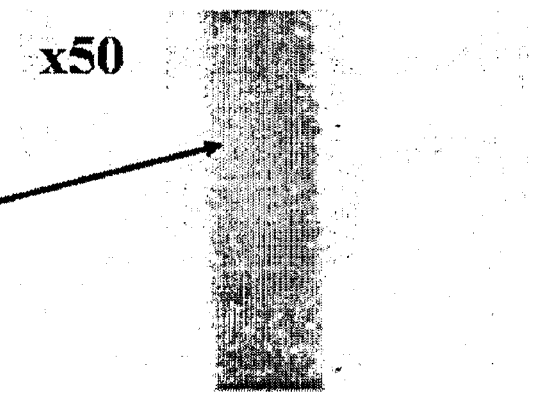
FIG. 2A          FIG. 2B FIG. 3A　　　　　　　　　FIG. 3B
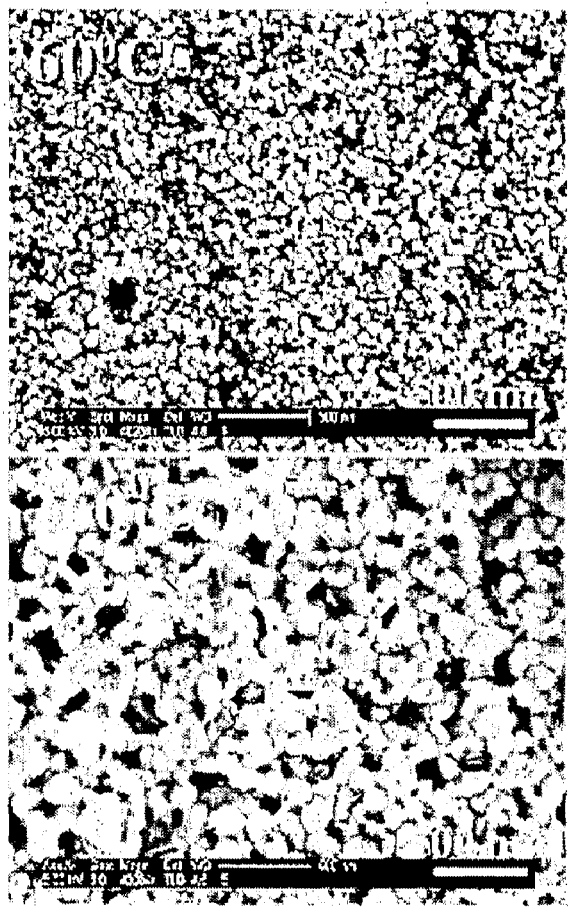 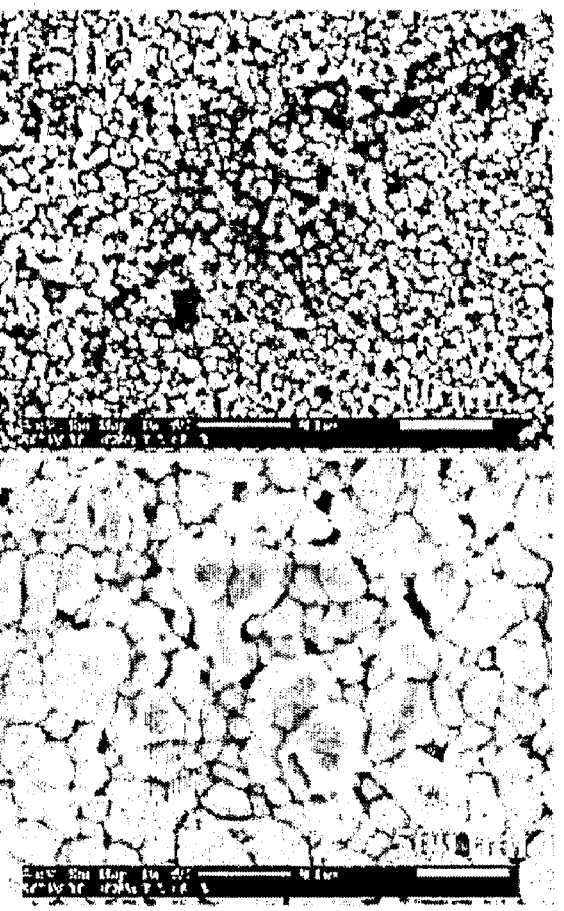
FIG. 3C　　　　　　　　　FIG. 3D

METHOD OF FORMING AQUEOUS-BASED DISPERSIONS OF METAL NANOPARTICLES

FIELD OF THE INVENTION

The present invention relates to the field of metal nanoparticle dispersions. More particularly, the present invention relates to aqueous-based dispersions of metal nanoparticles, a method for their preparation and compositions such as ink comprising such dispersions.

BACKGROUND OF THE INVENTION

Metallic nanoparticles draw intense scientific and practical interest due to their unique properties, which differ from those of bulk and atomic species. Such a difference is determined by peculiarity of electronic structure of the metal nanoparticles and extremely large surface area with a high percentage of surface atoms. Metal nanoparticles exhibit a drastic decrease in melting point compared to that of the bulk material, they are characterized by enhanced reactivity of the surface atoms, high electric conductivity and unique optical properties. Virtually, nanosized materials are well-known materials with novel properties and promising applications in electrochemistry, microelectronics, optical, electronic and magnetic devices and sensors, in new types of active and selective catalysts, as well as in biosensors. Creation of stable concentrated nanocolloids of metals with low resistivity offers new prospects in computer-defined direct-write non-contact technologies, such as ink-jet printing, for deposition of metallic structures on various substrates. Microfabrications of such structures by lithographic and electroless techniques are time-consuming and expensive processes, and there is a real industrial need for direct digital printing of conductive patterns. Suggestions based on jetting small droplets of molten metals onto the substrate have met several problems, such as difficulty of adhering droplets onto a substrate, oxidation of the liquid metal, and the difficulty of fabrication a droplet-ejection mechanism compatible with high temperatures. Direct patterning by ink-jet printing, in addition to the conventional graphic applications, was reported in the last decade for various applications, such as fabrication of transistors and organic light emitting diodes, polymer films, structural ceramics and biotechnology.

Conventional ink-jet inks may contain two types of colorants, dye or pigment, and are characterized by their main liquid, which is the vehicle for the ink. The main liquid may be water (water-based inks), or an organic solvent (solvent-based inks).

The dye or pigment-based inks differ with respect to the physical nature of the colorant. Pigment is a colored material that is insoluble in the liquid, while the dye is soluble in the liquid. Each system has drawbacks: pigments tend to aggregate, and therefore clog the nozzles in the orifice plate, or the narrow tubings in the printhead, thus preventing the jetting of the ink while printing. Dyes tend to dry, and form a crust on the orifice plate, thus causing failure in jetting and misdirection of jets.

It is clear that the terms "dye" or "pigment" are the general wordings for materials, which are soluble or insoluble, respectively, in the solvents comprising the ink. Therefore, metal nanoparticles may be considered, in this context, if introduced into ink, as pigments of metal, having a size in the nanometer range.

Conventional pigments in ink-jet inks contain particles in the size range of 100-400 nm. In theory, reducing the particle size to 50 nm or less should show improved image quality and improved printhead reliability when compared to inks containing significantly larger particles.

The majority of inks in ink-jet printers are water-based inks. The use of metal nanoparticles as pigments requires the elaboration of ink formulations containing stable concentrated aqueous metal colloid. The synthesis of stable colloidal systems with high metal concentration is a serious problem. A variety of substances have been used to stabilize silver colloids: amphiphilic nonionic polymers and polyelectrolytes, ionic and nonionic surfactants, polyphosphates, nitrilotriacetate, 3-aminopropyltrimethoxysilane, and $CS_2$. Stable water-soluble silver nanoparticles were also obtained by reduction of silver ions in the presence of amino- and carboxilate-terminated poly(amido amine) dendrimers, and crown ethers. The preparations of stable silver colloids, having low metal concentrations are described in the literature, in procedures based on reduction of metal from solution. The metal concentrations in these procedures amount only to $10^{-2}$ M (about 0.1%) even in the presence of stabilizers (it is almost impossible to obtain a stable aqueous silver colloid with the metal concentrations higher then $10^{-3}$ M without an additional stabilizer, due to fast particle aggregation). The preparation of ink compositions having silver nanoparticle concentration of up to about 1.5 wt % (during the reaction step) is described in WO 03/038002.

The synthesis of concentrated silver nanoparticles is described in:

B. H. Ryu et al., Synthesis of highly concentrated silver nanoparticles, assisted polymeric dispersant, KEY ENGINEERING MATERIALS 264-268: 141-142 Part 1-3 2004;

Beyong-Hwan Ryu et al., Printability of the synthesized silver nano sol in micro-patterning of electrode on ITO glass, Asia display/IMID 04 Proceedings, pages 1-4;

Ivan Sondi et al., Preparation of highly concentrated stable dispersions of uniform silver nanoparticles, Journal of colloid and Interface Science, 260 (2003) 75-81;

Dan V. Goaia et al., Preparation of monodispersed metal particles, New J. Chem. 1998, pages 1203-1215.

Since ink-jet ink compositions contain, in addition to dyes or pigments, other additives, such as humectants, bactericides and fungicides and binders (polymeric additives, which improve the dye or pigment binding to substrate), the stabilizers should be compatible with these substances and should not change noticeably the physicochemical and rheological characteristics of inks (the most important characteristics are viscosity and surface tension).

Several methods of the metallic image generation with the use of ink-jet technology have been described.

One known method is based on an ink containing a reducing agent and receiving material containing the reducible silver compound ($AgNO_3$ or silver di(2-ethylhexyl)-sulphosuccinate), and, on the contrary, an ink and a receiving support containing a silver compound and reducer, respectively. Heating the receiving support during or after the ink deposition resulted in an image formed by silver metal (U.S. Pat. No. 5,501,150 to Leenders, et al; U.S. Pat. No. 5,621,449 to Leenders, et al).

Another approach for the deposition of metallic structures is based on ink-jet printing of organometallic precursor dissolved in organic solvent with subsequent conversion of the precursor to metal at elevated temperatures (~300° C.). To increase the metal (silver) loading of ink and to obtain higher decomposition rates, silver or other metal nanoparticles may be added to the ink along with the organometallic precursor. Near-bulk conductivity of printed silver films has been achieved with such compositions (Vest, R. W.; Tweedell, E. P.; Buchanan, R. C. *Int. J. Hybrid Microelectron.* 1983, 6, 261; Teng, K. F.; Vest, R. W. *IEEE Trans. Indust. Electron.* 1988, 35, 407; Teng, K. F.; Vest, R. W. *IEEE Electron. Device Lett.* 1988, 9, 591; Curtis, C.; Rivkin, T.; Miedaner, A.; Alleman, J.; Perkins, J.; Smith, L.; Ginley, D. *Proc. of the NCPV Program Review Meeting.* Lakewood, Colo., USA, 14-17 October 2001, p. 249).

Fuller et al. demonstrated inkjet printing with the use of colloidal inks containing 5-7 nm particles of gold and silver in an organic solvent, α-terpineol, in order to build electrically and mechanically functional metallic structures. When sintered, the resistivity of printed silver structures was found to be 3 μΩ·cm, about twice of that for bulk silver (Fuller, S. B.; Wilhelm, E. J.; Jacobson, J. M. *J. Microelectromech. Syst.* 2002, 11, 54).

The inventors have previously described the preparation of stabilized nanodispersions with silver concentration up to 1.5 wt %, at the reaction step which were shown to be suitable pigments for water-based ink-jet inks (WO 03/038002; Magdassi, S.; Bassa, A.; Vinetsky, Y.; Kamyshny, A. *Chem. Mater.* 2003, 15, 2208). The stabilizers used were ionic polymeric materials such as carboxymethyl cellulose (CMC) and polypyrrole (PPy), the silver nanoparticles size did not exceed 100 nm.

There is a widely recognized need and it will be highly advantageous to have a new method for obtaining aqueous-based dispersion of metal nanoparticles, preferably silver nanoparticles, which is simplified in production, which enables production of metal nanodispersion characterized by small diameter of the nanoparticles and high nanoparticle concentration and yet which is physically stable (i.e. does not undergo caking or agglomeration and can be easily redispersed if present as a sediment or a powder). Additionally it would be highly advantageous to have an aqueous based dispersion of metal nanoparticles with improved properties such as high electric conductivity when applied onto a substrate.

SUMMARY OF THE INVENTION

The present invention relates to a method for preparing an aqueous-based dispersion of metal nanoparticles comprising:
(a) providing an aqueous suspension of a metal salt;
(b) pre-reducing said metal salt suspension by a water soluble polymer capable of metal reduction to form metal nuclei; and
(c) adding a chemical reducer to form metal nanoparticles in dispersion.

The present invention additionally relates to an aqueous-based dispersion comprising metal nanoparticles and at least one water soluble polymer, said aqueous-based dispersion is characterized by:
(a) the concentration of said metal nanoparticles in said dispersion is in the range 0.5-35 wt %;
(b) the size of said nanoparticles is below 20 nm in diameter; and
(c) the weight ratio of said water soluble polymer to said metal nanoparticles is below 0.1:1.

The present invention further relates to an aqueous-based dispersion comprising metal nanoparticles and at least one water soluble dispersant, said aqueous-based dispersion is characterized by:
(a) the concentration of said metal nanoparticles in said dispersion is in the range 5-80 wt %;
(b) the size of said nanoparticles is below 20 nm in diameter; and
(c) the weight ratio of said water soluble dispersant to said metal nanoparticles is below 0.1:1.

BRIEF DESCRIPTION OF FIGURES

FIG. 1 shows TEM images of nanoparticles in concentrated Ag dispersions (FIG. 1A—8 wt %; FIG. 1B—20 wt %).

FIG. 2 shows silver patterns printed by ink-jet printer onto polyimide film (ink formulation contains 8 wt % silver and 0.5% BYK 348 as a wetting agent). On the left side (FIG. 2A), the part of the line (12 ml length, 1.5 mm width, 3.5 μm thickness), on which the conductivity was measured, is shown (magnified in FIG. 2B).

FIG. 3A-D shows High Resolution SEM micrographs of the image obtained with silver nanodispersion deposited on glass slide, dried and sintered at various temperatures (60° C., 150° C., 260° C., 320° C.).

FIG. 4 displays the conductivity (σ) of deposited and sintered samples relative to the conductivity of bulk silver ($6.3 \cdot 10^7$ $ohm^{-1}m^{-1}$).

FIG. 5 shows optical and HR-SEM images of a ring formed on a glass substrate.
(Down left) Optical microscope image of a 2 mm diameter ring formed by drying a drop of silver dispersion and (up left) HR-SEM top-view image of the same ring, showing also the adjacent inner area enclosed by the ring and the gradual decrease in the particle density towards the center of the ring. (Right) HR-SEM image of the particles in the ring.

FIG. 6 presents the view of multiply twined nanoparticles prepared as described in Example 3.

DETAILED DESCRIPTION OF THE INVENTION

Figure 4:
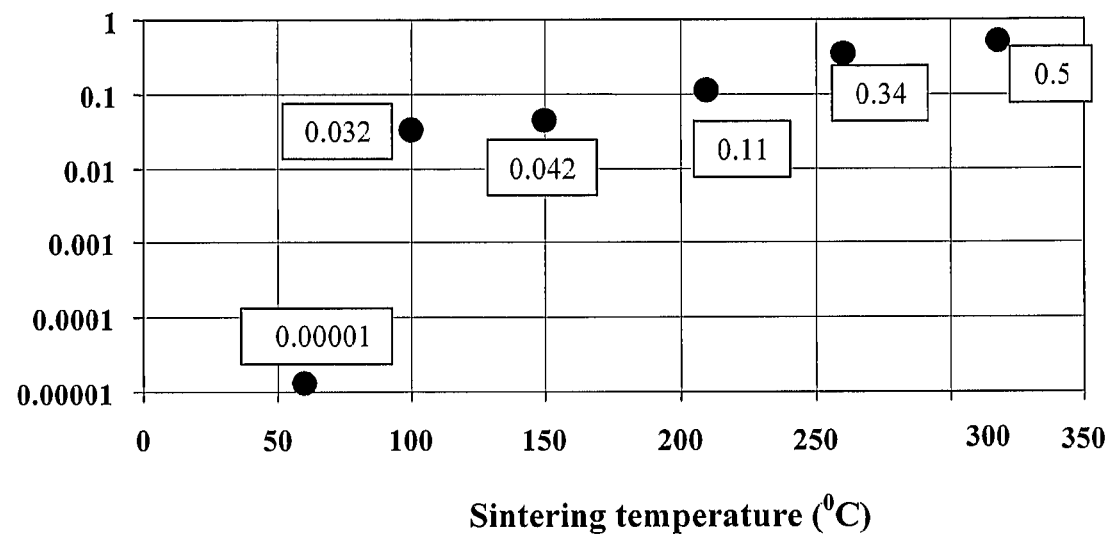

According to the present invention it is possible to obtain aqueous-based dispersion of metal nanoparticles from an aqueous suspension of a metal salt by using water soluble polymers, which have a dual function: One function is as initiators of the metal reduction process by providing a "pre-reduction" step while forming the metal nuclei, which serve as nucleation centers for subsequent reduction by reducing agent. Another function is as stabilizers of the formed metal nuclei and the resulting nanoparticles (preventing their agglomeration). The aqueous based dispersions of the present invention are characterized by high metal content, low particles size at the same or even lower stabilizer (water soluble polymer)-to-metal ratio compared to the prior art, high conductivity (after deposition onto substrates and drying).

The aqueous-based dispersions obtained by using an aqueous suspension of metal salt and these dual effect stabilizers (water soluble polymers) show the following advantageous properties:
1) The concentration of metal nanoparticles during the reaction step (before separation step) can be up to about 35 wt %. Since a powder of redispersible metal nanoparticles (preferably silver nanoparticles) can be prepared according to this patent application, concentrated dispersions (up to 80% wt %) may be prepared.
2) The ratio of the water-soluble polymer to the metal can be decreased below that in the prior art in spite of much higher concentration of silver nanoparticles. This is highly advantageous since it enables production of a more pure product having low content of organic material which may interfere with the high conductivity properties.
3) The metal nanoparticle dispersions can form, upon drying of droplets, densely packed rings, which are conductive even at room temperature, without further heat induced sintering.

4) The metal nanoparticle dispersions are prepared by a pre-reduction of a metal salt (present in the form of aqueous suspension) with a proper water soluble polymer, which functions as a reducer and a stabilizer, followed by full reduction (exhaustive reduction) obtained by a chemical reducer, such as tri-sodium citrate, ascorbic acid, di-sodium tartrate, hydrazine, sodium borohydride, or mixtures thereof. This enables production of nanoparticles having high concentrations in dispersion and small size.

5) The preferred silver salt used in the preparation of the nanoparticles is silver acetate. Possibly due to: a) the action of acetate ion in aggregation of the nanoparticles. This allows easy separation of nanoparticles from the aqueous medium at the end of the reaction process (after full reduction with the chemical reducer). b) due to the low solubility of the silver acetate salt, the silver ion concentration is kept below silver salt saturation value (for example about 2.5 wt % at 95° C.), thus the undissolved silver acetate serves as reservoir of silver ion. The low concentration of silver ion enables production of smaller particles at high metal salt concentrations.

6) The nanoparticle size of the obtained dispersions after separation is preferably below 20 nm and can be as low as 5-8 nm. Due to the smaller particle size the sedimentation rate is very slow, and is hindered by the Brownian motion. This is advantageous when long term stability is required. Additionally the sintering temperature can be lowered compared to particles having a larger size.

Thus, the present invention is based on the findings that it is possible to obtain aqueous-based dispersions of metal nanoparticles by a new method which comprises metal ions reduction in an aqueous suspension of metal salt, using water soluble polymers which are capable of metal reduction followed by full reduction using a chemical reducer. The method includes two-step reduction, first with a water soluble polymer to obtain metal nuclei, and then exhaustive reduction with a chemical reducer to form nanoparticles in dispersion.

The new method of preparation enables formation of physically stable dispersions (i.e. which do not undergo caking and agglomeration). Separation step may be very simple due to spontaneous formation of a sediment as a result of nanoparticle aggregation. Therefore centrifugation step may be omitted. The new method enables formation of aggregated nanoparticles which can be easily separated from the aqueous medium and redispersed. The formed sediment can be easily redispersed in a liquid (after separating from the aqueous medium) by using a suitable dispersing agent to form a stable and more concentrated dispersion.

Thus, the formed nanoparticles in the dispersion may be in an aggregated form (i.e. the nanoparticles maybe partially or mostly in an aggregated form).

The method utilizes metal salts (preferably silver salts) having low solubility in water (preferably up to 5% w/w, at a temperature of 100® C.) which results in low concentration of metal ions in the solution phase of the reaction mixture. At these conditions, small metallic nanoparticles are formed even at low concentrations of water soluble polymer (stabilizer).

This method allows obtaining much higher concentration of metallic silver, at low stabilizer:silver ratio, after completion of reduction with a chemical reducer compared to all known procedures. This is highly advantageous since a more pure dispersion is obtained at the end of the process. This is important for example in applications where formation of conductive patterns is required.

The weight ratio of the water soluble polymer (stabilizing polymer, protective agent) to metal that can be used according to this new method is much lower than in all known procedures, and may be only 0.01:1.

This is highly advantageous especially when low viscosity aqueous dispersion are required and if direct contact between the particles is required after application, for example, electrical conductivity and metallic appearance.

The new method enables to obtain nanodispersions or nanopowders (after the separation step) with organic: metal (preferably silver) weight ratio below 0.07:1 and this ratio can be as low as 0.03:1-0.05:1. Therefore, the obtained product is more pure and can be successfully used, for example, for formation of conductive patterns (due to low content of insulating organic material).

The size (diameter) of silver nanoparticles may be as low as 5-8 nm.

Rings produced by depositing drops of the obtained silver dispersion onto a substrate display high electric conductivity (up to 15% of that for bulk silver) at room temperature, without sintering at elevated temperatures. Various types of conductive patterns can be obtained by deposition of arrays of said rings by various means such as ink jet printing.

Thus, the present invention relates to a method for preparing an aqueous-based dispersion of metal nanoparticles comprising:
(a) providing an aqueous suspension of a metal salt;
(b) pre-reducing of said metal salt suspension by a water soluble polymer capable of metal reduction to form metal nuclei; and
(c) adding a chemical reducer to form metal nanoparticles in dispersion.

The term "aqueous-based" as used herein, means that the dispersing medium of the dispersion comprises either water or an aqueous liquid or solution. Most preferably, the aqueous medium (dispersing medium) is all water, however the dispersing medium may also contain small amounts (preferably up to about 25 wt %, based on the total weight of the dispersing medium) of organic solvents which are miscible with water.

By the term "pre-reducing" in step (b) is meant that the water soluble polymer initiates metal reduction and reduces part the metal ions in the aqueous suspension.

Full reduction of the remaining metal ions is obtained in step (c).

By the term "metal nuclei" is meant an intermediate nanoparticle, wherein the average size of said nuclei is below the average size of the nanoparticles obtained in step (c).

The dispersion preparation may be also conducted by double jet method. (consisting of mixing two jets: of the dispersion obtained from step (b) and the chemical reducer from step (c).).

The method may further comprise at least one step (i.e. a step or repeated steps) of separating the nanoparticles obtained in step (c) from the aqueous medium of said dispersion and redispersing in a liquid to form a dispersion of nanoparticles.

Thus, according to a preferred embodiment of the present invention the method comprises:
(a) providing an aqueous suspension of a metal salt;
(b) pre-reducing of said metal salt suspension by a water soluble polymer capable of metal reduction to form metal nuclei;
(c) adding a chemical reducer to form metal nanoparticles in dispersion; and (d) at least one step of separating the nanoparticles obtained in step (c) from the aqueous medium of said dispersion and redispersing in a liquid to form a dispersion of nanoparticles.

According to a preferred embodiment of the present invention, the separation is selected from centrifugation, decantation, filtration, ultrafiltration, and a combination thereof.

Further according to a preferred embodiment of the present invention, the redispersing is performed using a suitable dispersing agent and optionally a wetting agent. The wetting agent may be added before or after the separation, preferably before the separation.

Preferably the dispersing agent is a water soluble dispersant.

Still further according to a preferred embodiment of the present invention, the dispersing agent is selected from surfactants, water soluble polymers, and mixtures of any of the above.

Additionally according to a preferred embodiment of the present invention, the water soluble polymer is a polyelectrolyte.

Further according to a preferred embodiment of the present invention, the polyelectrolyte (dispersing agent) is selected from Disperbyk 190, Solsperse 40000, and mixtures of any of the above.

Disperbyk 190 is a High-molecular-weight block copolymer with acidic affinic groups (acid value 10 mg KOH $g^{-1}$), which can be obtained from BYK Chemie Germany.

Solsperse 40000 is a Water-soluble anionic phosphated alkoxylated polymer, which can be obtained from Avecia, England.

The wetting agent may be a surfactant. The surfactant may be for example BYK-154, BYK-348, Disperbyk 181, Disperbyk 184, LABS (such as LABS-W-100), and LABS salts, and mixtures of any of the above.

BYK-154 is an Ammonium salt of an acrylate copolymer, which can be obtained from BYK Chemie, Germany.

BYK-348 is a Polyether modified poly-dimethyl siloxane, which can be obtained from BYK Chemie, Germany.

Disperbyk 181 is an Alkanolammonium salt of a polyfunctional polymer (acid value 30 mg KOH $g^{-1}$), which can be obtained from BYK Chemie, Germany.

Disperbyk 184 is a High-molecular-weight block copolymer with pigment affinic groups (acid value 10 mg KOH $g^{-1}$), which can be obtained from BYK Chemie, Germany.

LABS is a Linear alkyl benzene sulphonic acid which may have different chain length.

LABS-W-100 is a Linear alkyl benzene sulphonic acid, which can be obtained from Zohar-Dalia, Israel.

The wetting agent may be for example a surfactant.

Preferably the liquid is an aqueous liquid (the liquid used for redispersing of the nanoparticles after separation from the aqueous medium).

The method may further comprise at least one step (i.e. a step or repeated steps) of separating the nanoparticles obtained in step (c) from the aqueous medium of said dispersion followed by removal of the water in order to obtain a powder of metallic particles. The removal of the water can be obtained by various methods such as loyphilization, spray drying, oven drying, vacuum drying etc. Prior to removal of the aqueous phase (medium) redispersing agents may be added such as wetting agents, dispersant etc.

The powder may be further redispersed in a liquid such as an aqueous liquid or non-aqueous liquid (such as organic solvents, oils etc.).

Preferably the obtained powder of metal nanoparticles is characterized by a weight ratio of the organic material to the metal nanoparticles of below 0.1:1, more preferably below 0.07:1, still more preferably in the range 0.03:1-0.05:1. Such a powder is capable of redispersing in a liquid (aqueous liquid or non aqueous liquid such as organic solvents, or mixtures thereof), preferably without addition of a dispersant. The particle size after redispersion is preferably less that 20 nm in diameter.

Preferably step (b) includes incubation for a period of at least 5 minutes. i.e. the aqueous metal suspension and the water soluble polymer are incubated for at least 5 minutes to form a metal nuclei. (Preferably for 5-15 minutes).

Preferably the aqueous metal suspension and the water soluble polymer are incubated for a period of at least 5 minutes (preferably for 5 to 15 min) while stirring.

According to another preferred embodiment of the present invention, step (b) is conducted at a temperature range of 20-100° C. More preferably step (b) is conducted at a temperature range of 50-95° C.

Additionally according to a preferred embodiment of the present invention, step (c) is conducted at a temperature range of 20-100° C. More preferably step (c) is conducted at a temperature range of 50-95° C.

Preferably step (c) further includes a cooling step.

Moreover according to a preferred embodiment of the present invention step (c) is conducted at a temperature range of 20-100° C., more preferably 50-95° C., followed by cooling to a temperature range 10-30° C., more preferably 15-25° C.

Further according to a more preferred embodiment of the present invention, the metal nanoparticles are selected from silver nanoparticles, gold nanoparticles, platinum nanoparticles, palladium nanoparticles and a mixture of any of the above.

Most preferably the metal nanoparticles are silver nanoparticles.

The metal salt is preferably a silver salt or a gold salt, most preferably a silver salt.

The metal salt may also be a platinum salt or palladium salt.

Moreover according to a preferred embodiment of the present invention, the metal salt have low water solubility.

Moreover according to a preferred embodiment of the present invention, the metal salt have a solubility (solubility in water) of up to 5% w/w at a temperature of 100° C.

According to an additional preferred embodiment of the present invention, the metal salt (preferably silver salt) is selected from silver acetate, silver sulfate, silver carbonate, and mixtures of any of the above. Most preferably the metal salt is silver acetate.

Preferably the metal salt is a metal acetate salt, and most preferably the metal acetate salt is silver acetate.

Further according to a preferred embodiment of the present invention, the content of the metal salt in the suspension is in the range of 1.0 to 50 wt % (based on the total weight of the suspension).

The concentration of said metal salt in said suspension may be in the range of 15 to 35 wt %, and preferably in the range of 15 to 25 wt % (based on the total weight of the suspension).

Additionally, according to a preferred embodiment of the present invention, the concentration of said metal nanoparticles in said dispersion is in the range 0.5-35 wt %, based on the total weight of the dispersion.

The concentration of said metal nanoparticles in said dispersion (prior to the separation step) may be in the range 1.5-35 wt %, preferably 2-30 wt %, more preferably 3-25 wt %, and most preferably 5-25 wt %, based on the total weight of the dispersion. The concentration may also be in the range 3-35 wt %, preferably 5-35 wt %, more preferably 5-30 wt %, still more preferably 5-25 wt %, based on the total weight of the dispersion.

As used in the present invention by the term particle size below a certain value in diameter, for example by the term "particle size of said nanoparticles is below 50 mm in diameter" is meant that the mean particle diameter according to 90% by number of the particles ($d_{90}$) is under 50 nm, as measured by Dynamic Light Scattering.

Similarly, as used herein by the term "particle size of said nanoparticles is below 20 nm in diameter" is meant that 90% of mean particle diameter calculated by number is under 20 nm, as measured by Dynamic Light Scattering.

The particle size of the nanoparticles may be below 50 nm in diameter, preferably below 40 nm in diameter. More preferably the particle size is below 20 nm in diameter, even more preferably below 18 nm in diameter, still more preferably in the range 5-15 nm in diameter, and most preferably in the range 5-8 nm in diameter.

The nanoparticles of the present invention may be spherical, rod-like shaped or a combination thereof. Most preferably the nanoparticles are spherical shaped.

In the case where the nanoparticles are rod shaped, preferably the width of said particles is below 20 nm, the length to width ratio is up to 1:5 (preferably the length to width ratio in the range of 1:1.2 to 1:3)

The nanoparticles of the present invention may be multiply tweened particles (mtp).

Preferably the multiply twined nanoparticles are capable of sintering at the temperature range of 90-320° C., more preferably at the temperature range of 100-160° C.

The formed nanoparticle dispersion obtained after step (c) in the method described above, may be in the form of aggregates of nanoparticles which are physically stable (i.e. do not undergo caking in case a sediment is formed) and can be easily redispersed in a liquid following separation from the aqueous dispersion, thus allowing formation of a more concentrated stable dispersions.

Further according to a preferred embodiment of the present invention, the concentration of said metal nanoparticles in the dispersion (the obtained dispersion after separation step) is in the range 5-80 wt %, based on the total weight of the dispersion, and more preferably in the range 10-80 wt %, based on the total weight of the dispersion. The concentration of said metal nanoparticles in the dispersion may be in the range 10-60 wt %, and more preferably in the range 20-60 wt %. The concentration of the metal nanoparticles in the dispersion may also be in the range 35-80 wt % and more preferably 40-60 wt %. (This preferred embodiment refers to the dispersion obtained after separating the nanoparticles obtained in step (c) from the aqueous medium of the dispersion and redispersing in a liquid to form a dispersion of nanoparticles.).

As may be understood by any person skilled in the art, there is a plurality of water soluble polymers (stabilizers), which are appropriate for use in the composition (aqueous-based dispersions) of the present invention and a man versed in the art can select for appropriate water soluble polymers using the following criteria:

Suitable water soluble polymers are those meeting the following criteria:
1) Lack of gel formation in the presence of metal ions. Water soluble polymers, which do not form a gel at concentrations required to initiate metal reduction and form a metal nuclei, are selected. The concentration of the polymers in the obtained dispersion will depend on the type of the polymer and can be lower than 0.5 wt % for a polymer such as polypyrole (and higher up to 10 wt % for a polymer such as Sokolan HP80).
2) Stabilization of metal nanoparticles. Water soluble polymers, which are also capable of stabilizing the formed metal (such as silver) nuclei were chosen. Such protective agents are water soluble polymers possessing electrostatic and steric effects of stabilization.

After formation of nanoparticles in dispersion, the water soluble polymer stabilizes that dispersion, such that the nanoparticles can be easily redispersed (i.e. prevents caking of the dispersion).
3) Pre-reduction of metal ions with formation of metal nuclei. Polymers should pre-reduce metal (such as silver) ions with formation of metal nuclei, which serve as seeds for following formation of metal nanoparticles in dispersion after addition of the main chemical reducer.

Water soluble polymers, which fulfill all the above criteria, are chosen to be used in the aqueous dispersions of the present invention.

Preferably the water soluble polymer carries functional groups such as pyrrole, alkoxy, etheric, glycol, hydroxyl, amine groups, and combinations thereof. Such functional groups are capable of reducing metal ion.

According to a preferred embodiment of the present invention, the water soluble polymer is selected from polypyrrole, Sokalan HP80, Solsperse 40000, poly(ethylene glycol), and mixtures of any of the above.

Sokalan HP 80 is a Polycarboxylate ether, which can be obtained from BASF, Germany.

Solsperse 40000 is a Water-soluble anionic phosphated alkoxylated polymer, which can be obtained from Avecia, England.

Most preferably the water soluble polymer is polypyrrole.

Moreover according to a preferred embodiment of the present invention the metal salt is silver acetate and the water soluble polymer is polypyrrole.

Additionally according to a preferred embodiment of the present invention, the concentration of said water soluble polymer is in the range of 0.1-10.0 wt %.

The weight ratio of the water soluble polymer to the metal may be in the range of 0.01:1 to 1:1. Preferably the weight ratio of the water soluble polymer to the metal is below 0.1:1 (preferably in the range 0.01:1-0.1:1), more preferably in the range 0.01:1-0.06:1, even more preferably in the range 0.01:1-0.04:1, and most preferably in the range 0.01:1-0.025:1.

In case the water soluble polymer is polypyrole, the preferred concentration range is 0.1-1.0 wt %.

In case the water soluble polymer is Sokalan HP80, the preferred concentration range is 5.0-10.0 wt %.

Further according to a preferred embodiment of the present invention, the chemical reducer is selected from tri-sodium citrate, ascorbic acid, di-sodium tartrate, hydrazine, sodium borohydride, and mixtures of any of the above. Most preferably the chemical reducers are ascorbic acid and hydrazine.

Preferably the method further comprises adding a colorant to the dispersion.

The method may further comprise adding to the dispersion an additive selected from humectants, binders, surfactants, fungicides, rheology modifiers, pH adjusting agents, co-solvents, and mixtures thereof.

Preferably the aqueous-based dispersion is useful in preparing ink compositions, paints, or coatings.

Preferably the ink composition is for use in ink-jet printing.

The aqueous-based dispersion may be used in coating compositions to provide for example an optical effect on a substrate.

Moreover according to a more preferred embodiment of the present invention, the dispersion is for use in obtaining conductive patterns by deposition of the dispersion on a substrate and optionally followed by sintering.

In case conductive rings are obtained as will be detailed below the step of sintering can be omitted.

Further according to a preferred embodiment of the present invention, the method further comprises placing or jetting drops of the dispersion as described in the present invention onto a substrate to obtain conductive rings.

According to a preferred embodiment of the present invention the conductive rings have high electrical conductivity at room temperature.

Moreover according to a preferred embodiment of the present invention, the method further comprises dispensing a plurality of drops of the dispersion as described in the present invention onto a substrate to form arrays of conductive rings.

The arrays of conductive rings form a conductive pattern.

The substrate may be for example plastics, paper, photopaper, films (such as polyimide films), glass or PCB (printed circuits boards).

The invention further relates to an aqueous-based dispersion comprising metal nanoparticles and at least one water soluble polymer capable of initiating metal reduction, wherein the concentration of said metal nanoparticles in said dispersion is in the range 0.5-35 wt % and wherein the size of said nanoparticles is below 20 nm in diameter.

Such a dispersion is highly advantageous because of the combination of high nanoparticle concentration and low particle size of the nanoparticles provides superior properties to the dispersion such as high conductivity.

Moreover, formulating a dispersion characterized by high nanoparticles concentration and small particle size, and yet which is physically stable (does not undergo caking and aggregation) is a formulatory endeavor, and is non-obvious to obtain.

According to a preferred embodiment of the present invention the aqueous-based dispersion is a substantially pure aqueous-based dispersion. By a "substantially pure aqueous-based dispersion" is meant that the weight ratio of the water soluble polymer to the metal nanoparticles is preferably below 0.1:1 wt %, and most preferably in the range 0.01:1 to 0.025:1 wt %.

Preferably the aqueous-based dispersion consists essentially of metal nanoparticles and at least one water soluble polymer capable of initiating metal reduction, wherein the concentration of said metal nanoparticles in said dispersion is in the range 0.5-35 wt % and wherein the size of said nanoparticles is below 20 nm in diameter.

The present invention additionally relates to an aqueous-based dispersion comprising metal nanoparticles and at least one water soluble polymer, said aqueous-based dispersion is characterized by:

(a) the concentration of said metal nanoparticles in said dispersion is in the range 0.5-35 wt %;
(b) the size of said nanoparticles is below 20 nm in diameter; and
(c) the weight ratio of said water soluble polymer to said metal nanoparticles is below 0.1:1.

Preferably the concentration of said metal nanoparticles in said dispersion is in the range 1.5-35 wt %, more preferably in the range 2-30 wt %, more preferably in the range 3-25 wt %, and most preferably in the range 5-20 wt %.

The concentration may also be in the range 3-35 wt %, preferably 5-35 wt %, more preferably 5-30 wt %, still more preferably 5-25 wt %, based on the total weight of the dispersion.

According to a preferred embodiment of the present invention, the metal nanoparticles are selected from silver nanoparticles, gold nanoparticles, platinum nanoparticles, palladium nanoparticles and a mixture of any of the above.

Most preferably the metal nanoparticles are silver nanoparticles.

The water soluble polymer is capable of initiating metal reduction.

Preferably the water soluble polymer carries functional groups such as pyrrole, alkoxy, etheric, glycol, hydroxyl, amine groups, and combinations thereof. Such functional groups are capable of reducing metal ion.

Further according to a preferred embodiment of the present invention, the water soluble polymer is selected from polypyrrole, Sokalan HP80 (Polycarboxylate ether), Solsperse 40,000 (Water-soluble anionic phosphated alkoxylated polymer), poly(ethylene glycol), and mixtures of any of the above.

Most preferably the water soluble polymer is polypyrrole.

The water soluble polymer is capable of initiating metal reduction to form metal nuclei during preparation of the dispersion. The water soluble polymer also functions as a stabilizer during preparation of the dispersion and is capable of preventing metal nuclei aggregation and agglomeration after the pre-reduction step.

The water soluble polymer is further characterized in that it does not form a gel in the presence of metal ions, at concentrations used to prepare the dispersion.

Additionally according to a preferred embodiment of the present invention, the weight ratio of said water soluble polymer to said nanoparticles is below 0.1:1.

Preferably the weight ratio of the water soluble polymer to the nanoparticles is in the range 0.01:1-0.1:1.

More preferably the weight ratio of said water soluble polymer to said nanoparticles is in the range 0.01:1-0.06:1, even more preferably the weight ratio of said water soluble polymer to said nanoparticles is in the range 0.01:1-0.04:1. Most preferably the weight ratio of said water soluble polymer to said nanoparticles is in the range 0.01:1-0.025:1.

Further according to a preferred embodiment of the present invention, the size of said nanoparticles is below 18 nm in diameter.

Preferably the size of said nanoparticles is in the range 5-15 nm in diameter, more preferably the size of the nanoparticles is in the range 5-8 nm in diameter.

The aqueous dispersion may further comprise an organic solvent. The organic solvent may be for example dipropyleneglycol methyl ether (DPM), 2-methoxyethyl ether (diglyme), triethyleneglycol dimethyl ether (triglyme), propylene glycol, sulfolane, polyethylene glycol, glycerol. The concentration of the organic solvent may be up to 20 wt %, based on the total weight of the dispersion.

Moreover according to a preferred embodiment of the present invention, the aqueous dispersion is characterized in that the conductivity of the dispersion deposited onto substrate can be as high as 50% of that of the bulk metal.

The invention additionally relates to an aqueous-based dispersion comprising metal nanoparticles and at least one water soluble dispersant, wherein the concentration of said metal nanoparticles in said dispersion is in the range 5-80 wt % and wherein the size of said nanoparticles is below 20 nm in diameter.

Preferably the aqueous-based dispersion is a substantially pure aqueous-based dispersion. By the term "substantially pure aqueous-based dispersion" is meant that weight ratio of said water soluble dispersant to said nanoparticles is below 0.1:1.

Preferably the aqueous-based dispersion consists essentially of metal nanoparticles and at least one water soluble dispersant, wherein the concentration of said metal nanoparticles in said dispersion is in the range 5-80 wt % and wherein the size of said nanoparticles is below 20 nm in diameter.

The present invention additionally relates to an aqueous-based dispersion comprising metal nanoparticles and at least one water soluble dispersant, said aqueous-based dispersion is characterized by:
  (a) the concentration of said metal nanoparticles in said dispersion is in the range 5-80 wt %;
  (b) the size of said nanoparticles is below 20 nm in diameter; and
  (c) the weight ratio of said water dispersant to said metal nanoparticles is below 0.1:1.

According to a preferred embodiment of the present invention, the metal nanoparticles are selected from silver nanoparticles, gold nanoparticles, platinum nanoparticles, palladium nanoparticles and mixtures of any of the above.

Most preferably the metal nanoparticles are silver nanoparticles.

Further according to a preferred embodiment of the present invention, the water soluble dispersant is selected from surfactants, water soluble polymers, and mixtures of any of the above.

Still further according to a preferred embodiment of the present invention, the water soluble polymer is a polyelectrolyte.

Preferably the weight ratio of said water soluble dispersant to said nanoparticles is below 0.1:1, more preferably below 0.075:1, and most preferably in the range 0.04:1-0.06:1.

The weight ratio of the water soluble dispersant to the nanoparticles may also be in the range 0.04:1-0.1:1, and more preferably in the range 0.04:1-0.075:1.

Preferably the polyelectrolyte (dispersant) is selected from Disperbyk 190, Solsperse 40000, and mixtures of any of the above.

Moreover according to a more preferred embodiment of the present invention, the aqueous-based dispersion is characterized in that the conductivity of the dispersion deposited onto substrate can be as high as 50% of that of the bulk metal.

Further according to a preferred embodiment of the present invention, the size of said nanoparticles is below 18 nm in diameter.

Preferably the size of said nanoparticles is in the range 5-15 nm in diameter, more preferably the size of the nanoparticles is in the range 5-8 nm in diameter.

The nanoparticles may be spherical, rod-like shaped (as described above) or a combination thereof. Most preferably the nanoparticles are spherical shaped.

The nanoparticles may be multiply tweened particles (mtp).

Preferably the multiply twined nanoparticles are capable of sintering at the temperature range of 90-320° C., more preferably at the temperature range of 100-160° C.

The aqueous-based dispersions of the present invention may further comprise a water soluble metal salt (such as silver salt).

The water soluble silver salt may be for example silver acetate, silver nitrate, silver sulfate, silver carbonate, silver lactate, silver perchlorate, or mixtures thereof. Most preferably the silver salt is silver acetate.

The silver salt is preferably added to the final dispersion (at a concentration range of preferably 0.05-5 wt %) to achieve further increase in conductivity of printed pattern, which decomposes during sintering that results in formation of metallic (silver) additive acting as "glue" for sintering silver nanoparticles.

The aqueous-based dispersions of the invention comprises an aqueous medium which can be either water, an aqueous liquid or an aqueous solution.

According to additional preferred embodiment of the present invention, the aqueous-based dispersions of the present invention further comprising at least one member selected from humectants (such as dipropyleneglycol methyl ether (DPM), 2-methoxyethyl ether (diglyme), triethyleneglycol dimethyl ether (triglyme), propylene glycol, sulfolane, polyethylene glycol, glycerol), binders (such as polyvinylpyrrolidone (PVP), acrylic resins, acrylic latexes), surfactants (such as silwet L-77, BYK 348, BYK 346, BYK 333), fungicides, rheology modifiers (such as colloidal silica, clays, water soluble polymers), deformers (such as silicon derivatives), pH adjusting agents (such as acids and bases), and mixtures of any of the above.

BYK-333 is a Polyether modified poly-dimethyl polysiloxane, which can be obtained from BYK Chemie, Germany.

BYK-346 is a Polyether modified poly-dimethyl-siloxane, which can be obtained from BYK Chemie, Germany.

Silwet L-77 is a Polyalkylencoxide modified Heptamethyltrisiloxane and Allyloxypolyethyleneglycol methyl ether solution, which can be obtained from Helena Chemical Company, USA.

Preferably the aqueous-based dispersions are characterized by organic material:metal weight ratio of below 0.1:1, more preferably below 0.07:1. This ratio can be as low as 0.03:1-0.05:1. Therefore, the obtained product is more pure and can be successfully used, for example, for formation of conductive patterns (due to low content of insulating organic material).

According to another preferred embodiment of the present invention, the aqueous-based dispersions of the present invention further comprising a colorant.

The colorant may be for example organic dye or pigments.

The present invention additionally provides an ink composition comprising an aqueous based dispersion as described in the present invention.

The ink of the present invention may be characterized by the following: The metal nanoparticles concentrations in the ink are as high as 20 wt % if low viscosity ink is required (up to 5 cps) and can be up to 70-80 wt %, if high viscosity is required (up to 20 cps at jetting temperature).

Thus, the present invention provides compositions and methods for preparation of water-based inks (preferably ink-jet inks), in which the pigments are nanoparticles of metal, and composition and methods for preparing stable, concentrated dispersions of metallic nanoparticles. The ink composition of the present invention overcomes a common problem in pigment containing ink-jet inks, namely sedimentation, since the particle size is very small, preferably below 20 nm in diameter, thus the sedimentation rate is very slow, and is hindered by the Brownian motion.

It should be mentioned that the nanoparticles, due to their very small size, would behave differently, when compared to large particles. For example, nanoparticles have a lower melting point than bulk metal, and a lower sintering temperature than that of bulk metal. This property is of particular importance when sintering is needed in order to obtain electrical conductivity.

It is clear that the metallic patterns obtained by the aqueous dispersions of the present invention can be used for decoration purposes, even if the resulting pattern is not electrically conductive. Another aspect of the invention is that the resulting pattern of the silver nanoparticles has an antimicrobial effect, due to the presence of silver nanoparticles, thus eliminating the need for antimicrobial agents which are often introduced into water based ink jet inks.

In addition, we recently discovered a new approach to obtain conductive patterns based on the so called "coffee stain effect" (Deegan, R. D.; Bakajin, O.; Dupont, T. F.; Huber, G.; Nagel, S. R.; Witten, T. A. *Nature*, 1997, 389, 827), which becomes apparent when a spilled drop of coffee dries on a solid surface. This effect caused by capillary forces, results in formation of a dense ring along the perimeter of the drying droplet. We discovered that while drying droplets of silver dispersion, a very dense ring is formed at the perimeter of the droplet. This ring is composed of tightly packed silver nanoparticles, and it was surprisingly found that high electric conductivity of this ring is obtained even at room temperature.

Further, the present invention provides conductive rings produced by placing or jetting drops of a dispersion as described in the present invention onto a substrate.

According to a preferred embodiment of the present invention the conductive rings have high electrical conductivity at room temperature.

Moreover, the present invention provides conductive patterns obtained by dispensing a plurality of drops of a dispersion as described in the present invention onto a substrate to form arrays of conductive rings.

Ink-jet printing of conductive patterns by placing or jetting of dispersion droplets on a proper substrate may be applied in microelectronic industry.

Patterns can be used in microelectronics, for smart card obtaining, decorative coatings.

Preferably the high electrical conductivity is in the range of 5-50% of bulk silver for printed patterns (after sintering at 150-320° C.), in the range of 10-15% of bulk silver for deposited rings at room temperature and in the range of 15-50% of bulk silver for deposited rings (after sintering at 150-320° C.).

The present invention further provides a powder of metal nanoparticles characterized by a weight ratio of the organic material to the metal nanoparticles of below 0.1:1, more preferably below 0.07:1, still more preferably in the range 0.03:1-0.05:1. Such a powder is capable of redispersing in a liquid (aqueous liquid or non aqueous liquid such as organic solvents, or mixtures thereof), preferably without addition of a dispersant. The particle size after redispersion is preferably less that 20 nm in diameter.

Thus a solvent-based dispersion can be obtained by dispersing the powder in a solvent or a solvent mixture. The dispersion may optionally include binders, surfactants and rheology modifiers etc. and may be for use in ink-jet inks.

Preparation of Nanoparticles and Dispersions

Fine metal particles from micrometer to nanometer size can be synthesized by both physical methods (formation in gas phase, laser ablation) and chemical methods (sonochemical or photochemical reduction, electrochemical synthesis, chemical reduction), as are known in the art. The former methods provide fine metal particles by decreasing the size by applying energy to the bulk metal, while in the latter methods, fine particles are produced by increasing the size from metal atoms obtained by reduction of metal ions in solution.

In the present invention, the chemical method for the preparation of silver nanoparticles is preferably employed, namely, fine particles were produced by reduction of silver salt in a solution or a suspension with the use of a proper reducing agent according to the following scheme:

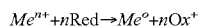

Two step reduction was employed, first with a water soluble polymer and second with a chemical reducer.

Silver nanoparticles can be prepared with the use of various reducing agents (chemical reducers), such as sodium borohydride, trisodium citrate, hydrazine, ascorbic acid, sugars and gaseous hydrogen.

Two principal stages are included in the procedure of preparation of concentrated and stable silver nanodispersions: a) synthesis step: pre-reduction of a silver salt by a water soluble polymer (synthetic or natural polymer), which is also a stabilizing agent, resulting in formation of silver nuclei; such nuclei serve as seeds for formation of silver nanoparticles (which can be in an aggregated form in dispersion). after addition of a proper chemical reducer; b) separation and concentration step: centrifugation is followed by decantation and redispersion of formed the silver nanoparticles in a proper dispersing medium. Such a method allows preparation of water-based nanodispersions with silver concentration as high as 10-80 wt %. The separation step can be also performed by an ultrafiltration process. The water from the dispersion can be further removed (by lyophilization, spray drying, vacuum drying oven drying etc.) and the obtained powder can be redispersed again in a small volume of water or organic solvent that results in formation of highly concentrated silver nanodispersion. The advantage of such dispersion is the low content of organic materials. Using the present invention, conductive patterns with conductivity of about 50% of the conductivity of bulk silver, can be obtained.

EXAMPLES

1. Preparation of Silver Nanodispersions Via Silver Salt Suspension

Examples 1-3

Materials and Reagents

Polypyrrole, 5% aqueous solution (PPy)
Ascorbic acid
Silver acetate (AgAc)
Dispersing agent Solsperse 40,000 (Avecia, England)
Triple distilled water (TDW)

| Silver acetate | 99% | Sigma-Aldrich | CAS 563-63-3 |
|---|---|---|---|
| PPy (Polypyrrole) | Doped, 5 wt % solution in water | Aldrich | CAS 30604-81-0 |
| Acsorbic acid | 99% | Sigma | CAS 50-81-7 |
| Solsperse 40,000 | 84.1% | Avecia | |

Instruments:
Hot plate with a stirrer
Centrifuge (Sorvall superspeed RC2-B)
Ultrasound bath (42 kHz)
DSL (Dynamic Light scattering) (Malvern HPPS/NanoSizer)
Oven for heating at 600° C.
Stock Solutions:
Ascorbic acid 30 wt %
Solsperse 40000 5 wt %

Example 1

Procedure

Nucleation step: 1 g of AgAc was added to 10.605 ml of TDW in a 28 ml vial. The vial was heated in a hot bath to 95° C. while stirring. After 5 min of stirring, 0.32 g of Ppy (5 wt %) was added.

Reaction. 15 min after addition of PPy, 0.865 g of ascorbic acid (30 wt %) was added, and reaction mixture was heated at 95° C. for 5 min while stirring and then was cooled in ice bath. A spontaneous formation of sediment is obtained as a result of nanoparticles aggregation.
Separations process: Cold Ag dispersion was centrifuged for 10 min at 5000 rpm, and all the supernatant liquid was decanted. 0.114 g (0.12 ml) of 30% Solsperse 40,000 was added to the rest. The resulting dispersion was treated in ultrasonic bath for 10 min and vortexed.
Mass Balance: (in the Reaction)
Silver concentration: 5 wt %
PPy concentration relative to silver: 2.5 wt %
Solsperse 40000 concentration relative to silver: 5.7 wt %
Characteristics of Obtained Dispersion:
Silver concentration: A precise amount of silver dispersion was placed in glass vial and heated at 600° C. for 30 min. Silver content in obtained dispersion was found to be 6.4 wt %.
Yield. The silver yield is 95.2%.
Particle size: See Table 1 (measured by DLS).

Example 2

Procedure

Nucleation: 2 g of AgAc was added to 8.45 ml of TDW in a 28 ml vial. The vial was heated in a hot bath to 95° C. while stirring. After 5 min of stirring, 0.64 g of Ppy (5 wt %) was added.
Reaction: 15 min after addition of PPy, 1.73 g of ascorbic acid (30 wt %) was added, and reaction mixture was heated at 95° C. for 5 min while stirring and then was cooled in ice bath. A spontaneous formation of sediment is obtained as a result of nanoparticles aggregation.
Separation process: Cold Ag dispersion was centrifuged for 10 min at 5000 rpm, and all the supernatant liquid was decanted. 0.228 g (0.12 ml) of 30% Solsperse 40,000 was added to the rest. The resulting dispersion was treated in ultrasonic bath for 10 min and vortexed.
Mass Balance: (in the Reaction)
Silver concentration: 10 wt %
PPy concentration relative to silver: 2.5 wt %
Solsperse 40000 concentration relative to silver: 5.7 wt %
Characteristics of Obtained Dispersion:
Silver concentration: A precise amount of silver dispersion was placed in glass vial and heated at 600° C. for 30 min. Silver content in obtained dispersion was found to be 14.05 wt %.
Yield: The silver yield is 97.3%.
Particle size: See Table 1 (measured by DLS).

Example 3

Procedure

Nucleation: 2 g of AgAc was added to 3.415 ml of TDW in a 28 ml vial. The vial was heated in a hot bath to 95° C. while stirring. After 5 min of stirring, 0.256 g of Ppy (5 wt %) was added.
Reaction: 15 min after addition of PPy, 1.73 g of ascorbic acid (30 wt %) was added, and reaction mixture was heated at 95° C. for 5 min while stirring and then was cooled in ice bath. A spontaneous formation of sediment is obtained as a result of nanoparticles aggregation.
Separation process: Cold Ag dispersion was centrifuged for 10 min at 5000 rpm, and all the supernatant liquid was decanted. 0.228 g (0.12 ml) of 30% Solsperse 40,000 was added to the rest. The resulting dispersion was treated in ultrasonic bath for 10 min and vortexed.
Mass Balance: (in the Reaction)
Silver concentration: 17.3 wt %
PPy concentration relative to silver: 1 wt %
Solsperse 40000 concentration relative to silver: 5.7 wt %
Characteristics of Obtained Dispersion:
Silver concentration: A precise amount of silver dispersion was placed in glass vial and heated at 600° C. for 30 min. Silver content in obtained dispersion was found to be 18 wt %.
Yield: The silver yield is more than 97.3%.
Particle size: See Table 1 (measured by DLS).

Examples 4-5

Materials and Reagents

Sokalan HP80
Ascorbic acid
Silver acetate (AgAc)
Dispersing agent Solsperse 40,000 (Avecia, England)
Triple distilled water (TDW)

| Silver acetate | 99% | Sigma-Aldrich | CAS 563-63-3 |
| Sokalan HP80 | 40 wt % solution in water | BASF | |
| Acsorbic acid | 99% | Sigma | CAS 50-81-7 |
| Solsperse 40,000 | 84.1% | Avecia | |

Instruments:
Hot plate with a stirrer
Centrifuge (Sorvall superspeed RC2-B)
Ultrasound bath (42 kHz)
DSL (Dynamic Light scattering) (Malvern HPPS/NanoSizer)
Oven for heating at 600° C.
Stock Solutions:
Ascorbic acid 15 wt %
Ascorbic acid 30 wt %
Solsperse 40000 5 wt %
Sokalan HP80 50 wt %

Example 4

Procedure

Nucleation step: 1 g of AgAc was added to 5.3 ml of TDW in a 28 ml vial. The vial was heated in a hot bath to 95° C. while stirring. After 5 min of stirring, 3.26 g of Sokalan HP80, 50 wt %, was added.
Reaction: 5 min after addition of Sokalan HP80, 3.46 g of ascorbic acid (15 wt %) was added, and reaction mixture was heated at 95° C. for 5 min while stirring and then was cooled in the ice bath.
Separation process: Cold Ag dispersion was centrifuged for 10 min at 5000 rpm, and all the supernatant liquid was decanted. 0.127 g (0.12 ml) of 30% Solsperse 40,000 was added to the rest. The resulting dispersion was treated in ultrasonic bath for 10 min and vortexed.
Mass Balance: (in the Reaction)
Silver concentration: 5 wt %
Sokalan HP80 concentration relative to silver: 100 wt %
Solsperse 40000 concentration relative to silver: 7.4 wt %

Characteristics of Obtained Dispersion:
Silver concentration: A precise amount of silver dispersion was placed in glass vial and heated at 600° C. for 30 min. Silver content in obtained dispersion was found to be 2.87 wt %.
Yield: The silver yield is 67.6%.
Particle size: See Table 1 (measured by DLS).

Example 5

Procedure

Nucleation: 2 g of AgAc was added to 4.3 ml of TDW in a 28 ml vial. The vial was heated in a hot bath to 95° C. while stirring. After 5 min of stirring, 3.26 g of Sokalan HP80, 50 wt %, was added.
Reaction: 5 min after addition of Sokalan HP80, 3.46 g of ascorbic acid (15 wt %) was added, and reaction mixture was heated at 95° C. for 5 min while stirring and then was cooled in the ice bath.
Separation process: Cold Ag dispersion was centrifuged for 10 min at 5000 rpm, and all the supernatant liquid was decanted. 0.22 g (0.21 ml) of 30% Solsperse 40,000 was added to the rest. The resulting dispersion was treated in ultrasonic bath for 10 min and vortexed.
Mass Balance: (in the Reaction)
Silver concentration: 10 wt %
PPy concentration relative to silver: 100 wt %
Solsperse 40000 concentration relative to silver: ~7 wt %
Characteristics of Obtained Dispersion:
Particle size: See Table 1 (measured by DLS).

TABLE 1

Particle size as measured by Dynamic Light Scattering (DLS)

| Example | Silver concentration in the reaction (wt %) | Stabilizer/silver ratio in the reaction (wt/wt) | $d_{90}$ (nm) | $d_{95}$ (nm) |
|---|---|---|---|---|
| 1 | 5 | 1/40 | 4.2 | 4.85 |
| 2 | 10 | 1/40 | 15.7 | 18.2 |
| 3 | 17.3 | 1/100 | 15.7 | 18.2 |
| 4 | 5 | 1/1 | 6.5 | 6.5 |
| 5 | 10 | 1/1 | 4.85 | 5.6 |

Values in nm, represent mean diameter particle size.
$d_{90}$ means that 90% of mean particle diameter calculated by number is below the indicated value.
$d_{95}$ means that means that 95% of mean particle diameter calculated by number is below the indicated value.

2. Preparation of Silver Nanopowder

The obtained concentrated silver nanodispersion can be further lyophilized to yield a powder, optionally in the presence of a wetting agent (which optionally is added before lyphilization). This powder can be easily redispersed in water, to yield a much more concentrated silver nanodispersion, up to 20-80 wt % of silver without change in the average particle size of silver nanoparticles compared to original dispersion (FIG. 1, right (FIG. 1B)).

3. Preparation of Ink-Jet Inks Containing Silver Nanoparticles

The suitability of prepared silver nanodispersions as pigments for ink-jet inks was evaluated with the use of Lexmark Z602 ink-jet printer. Several ink-jet formulations are described in the following examples. Each formulation was capable of printing. Printing was performed on various substrates, such as paper, photo-paper, polyimide films, transparency, glass and PCB (printed circuits boards). In general, the new ink-jet ink contains the silver nanoparticles, and aqueous solution which may contain surfactants, additional polymers, humectants, cosolvents, buffering agent, antimicrobial agents and defoamers in order to ensure proper jetting and adhesion of the ink to specific substrates. FIG. 2 presents an example of silver electrodes pattern printed onto polyimide film (ink formulation contains 8 wt % silver, 0.6 wt % Disperbyk 190 as a dispersing agent and 0.5% BYK 348 as a wetting agent). On the left side, the part of the line (12 mm length, 1.5 mm width, 3.5 μm thickness), on which the conductivity was measured, is shown. It should be emphasized that that printer requires inks with very low viscosities, a few cps. However, industrial printhead such as those produced by Spectra, are functional at viscosities as high as 15-20 cps. Therefore, for such printheads more concentrated dispersions of silver nanoparticles can be utilized. A silver dispersion having a silver content higher than 20% (up to about 80% w/w) can be prepared by redispersion the silver nanoparticles powder in a proper amount of aqueous phase.

Examples for Ink Compositions

Example 1

Silver nanodispersion (8 wt %) prepared as described above, containing 0.2 wt % BYK 346 and 5 wt % DPM.

Example 2

Silver nanodispersion (8 wt %) and containing 0.5 wt % BYK 346 and 10 wt % DPM.

Example 3

Silver nanodispersion (8 wt %) with 0.2 wt % BYK 346 and 20 wt % DPM.

Example 4

Silver nanodispersion (8 wt %) with 0.5 wt % BYK 346 and 15 wt % DPM.

Example 5

Silver nanodispersion (8 wt %) with 0.5 wt % BYK 346 and 5 wt % DPM.

Example 6

Silver nanodispersion (8 wt %) with 1 wt % BYK 346 and 10 wt % DPM.

Example 7

Silver nanodispersion (8 wt %) with 0.2 wt % BYK 346.

Example 8

Silver nanodispersion (8 wt %) with 0.2 wt % BYK 348.

Example 9

Silver nanodispersion (8 wt %) with 5 wt % DPM.

Example 10

Silver nanodispersion (8 wt %) with 0.5 wt % BYK 348.

Example 11

Silver nanodispersion (8 wt %) with 0.5 wt % BYK 348 and 5 wt % Diglyme.

Example 12

Silver nanodispersion (8 wt %) with 0.5 wt % BYK 348 and 5 wt % Triglyme.

Example 13

Silver nanodispersion (8 wt %) with 0.5 wt % BYK 348 and 5 wt % Propylene glycol.

Example 14

Silver nanodispersion (8 wt %) with 0.5 wt % BYK 348 and 5 wt % Polyethylene glycole 200.

Example 15

Silver nanodispersion (8 wt %) with 0.5 wt % BYK 348 and 5 wt % Glycerol.

Example 16

Silver nanodispersion (8 wt %) with 0.5 wt % BYK 348 and 0.2 wt % PVP (polyvinylpyrollidone) 10,000.

Example 17

Silver nanodispersion (8 wt %) with 0.5 wt % BYK 348 and 0.2 wt % PVP 40,000.

Example 18

Silver nanodispersion (8 wt %) with 0.5 wt % BYK 348 and 0.2 wt % PVP 55,000.

Example 19

Silver nanodispersion (8 wt %) with 0.5 wt % BYK 348 and 0.1 wt % PVP 10,000.

Example 20

Silver nanodispersion (8 wt %) with 0.5 wt % Sulfolane.

Example 21

Silver nanodispersion (25 wt %) with 0.05 wt % BYK 348.

Example 22

Silver nanodispersion (25 Wt %) with 0.1 wt % BYK 348.

Example 23

Silver nanodispersion (37 wt %) with 0.05 wt % BYK 348.

Example 24

Silver nanodispersion (37 wt %) with 0.1 wt % BYK 348.

Example 25

Silver nanodispersion (25 wt %) with 0.1 wt % BYK 348 and 0.2 wt % PVP 40,000.

Example 26

Silver nanodispersion (35 wt %) with 0.4 wt % silver acetate.

Example 27

Silver nanodispersion (35 wt %) with 1.0 wt % silver acetate.

4. Obtaining the Conductive Patterns

The conductive patterns can be obtained either by the direct printing (that can be repeated for several times) followed by sintering at a proper temperature (not higher than 320° C.) or/and by using the first metallic pattern to induce formation of additional metal layers, such as encountered in "electroless process". To improve the interconnection between nanoparticles and to increase the conductivity, a decomposable silver salt, such as silver acetate or silver nitrate, silver sulfate, silver carbonate and silver lactate, silver perchlorate can be added to the ink formulation. Printing may be also followed by additional dipping in electroless bath, or by printing the electroless solution onto the printed pattern. Actually, the printed nanoparticles can be used as templates for further crystallization and precipitation of other materials.

It has been found that the use of formulations described in Examples 1, 6, 10 and 16, as ink-jet inks, allows obtaining printed silver patterns, which were characterized by electric conductivity (the resistance of lines of 12 mm length, 1.5 mm width and 3.5-5 µm thickness printed 1 to 10 times, was measured). The conductivity was shown to increase with the increase in the number of printed layers as well as with the increase in sintering temperature (Table 2).

Further increase in conductivity of printed pattern can be achieved by addition of silver acetate to the final dispersion, which decomposes during sintering that results in formation of metallic (silver) additive acting as "glue" for sintering the silver nanoparticles.

40 µl of formulation of Example 10 was spread and dried on glass slide. Then the silver strip (70 mm length and 7 mm width) was sintered at 150° C. and 320° C. It has been found that addition of silver acetate to the ink formulation results in decrease in resistance of silver strip from 9.3 to 7.0Ω at 150° C. and from 1.4 to 1.1Ω at 320° C.

To observe the changes in the silver layer after sintering, we viewed silver dispersion deposited onto glass slides, dried and heated at various temperatures (60° C., 150° C., 260° C., 320° C.), by High Resolution SEM (FIG. 3). At 320° C. the electric conductivity can reach about 50% of that for the bulk metal (FIG. 4). The lower conductivity of printed lines compared to that of the deposited lines may result from defects and voids in the printed pattern.

TABLE 2

Resistance of silver lines (15 mm length, 1.5 mm width) printed onto polyimide films.

| Example No. | Number of printings | Sintering temperature (° C.) | Sintering time (min) | Resistance of printed line (Ω) |
| --- | --- | --- | --- | --- |
| 1 | 5 | 320° | 10 | 10 |
| 1 | 10 | 320° | 10 | 1.9 |

TABLE 2-continued

Resistance of silver lines (15 mm length, 1.5 mm width) printed onto polyimide films.

| Example No. | Number of printings | Sintering temperature (° C.) | Sintering time (min) | Resistance of printed line (Ω) |
|---|---|---|---|---|
| 6 | 10 | 320° | 10 | 7.6 |
| 10 | 10 | 150° | 240 | 4.8 |
| 10 | 10 | 200° | 60 | 4.0 |
| 10 | 10 | 250° | 60 | 2.4 |
| 10 | 1 | 320° | 10 | 252 |
| 10 | 10 | 320° | 10 | 2.6 |
| 16 | 10 | 150° | 240 | 7.7 |
| 16 | 10 | 200° | 60 | 4.3 |
| 16 | 10 | 250° | 60 | 3.2 |
| 16 | 1 | 320° | 10 | 73.3 |
| 16 | 10 | 320° | 10 | 2.4 |

Formation of conductive rings while drying the drops of silver dispersion is another approach to obtaining the conductive patterns. It was found that during drying of individual drop of the silver dispersion of nanoparticles, a dense ring is formed at its perimeter.

Figure 5:
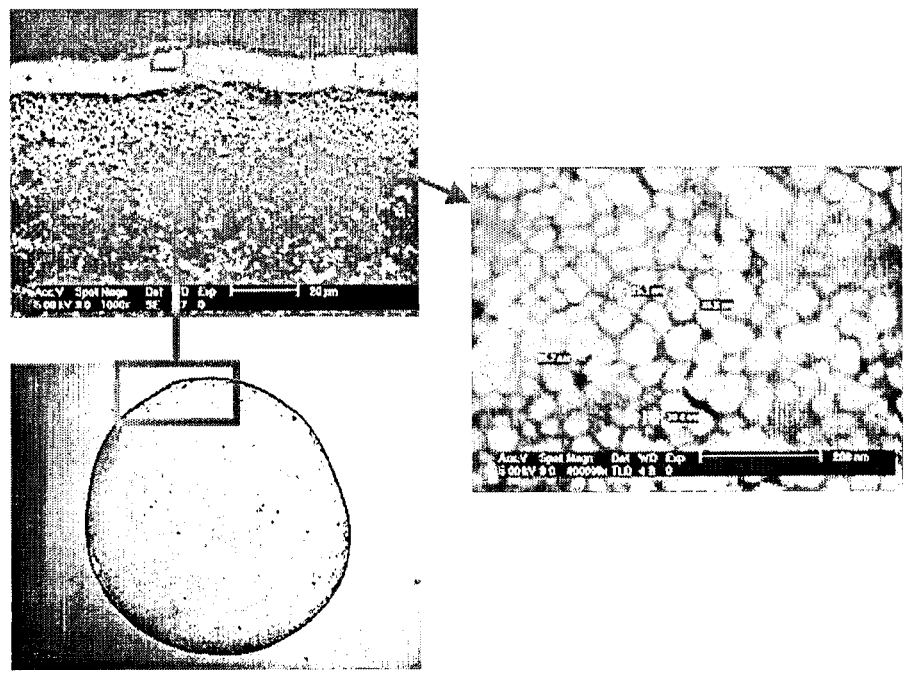
Figure 6:
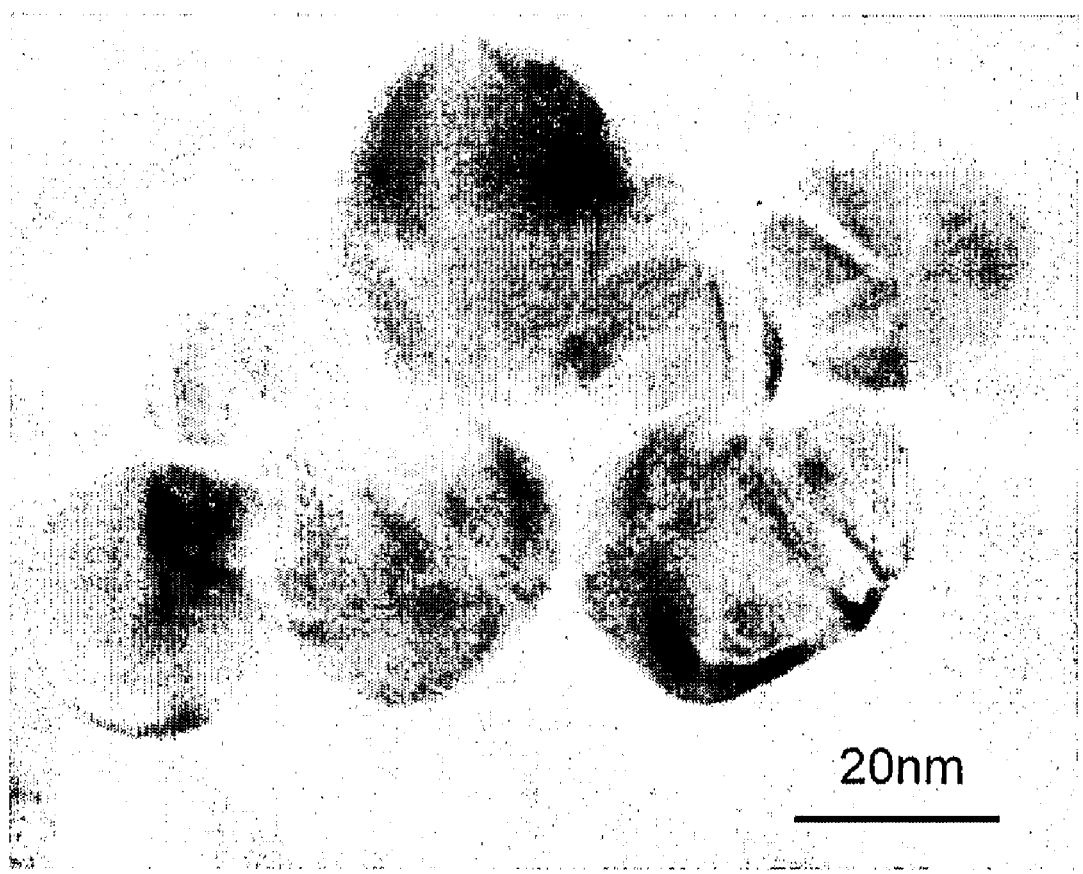

The ring preparation was performed as follows. A dispersion of silver nanoparticles containing 8 wt % of metal and 0.1 wt % of PPy was diluted 200 times, and the resulting concentrations of Ag and PPy were 0.04 and 0.0005 wt %, respectively. Then a drop of this dispersion (3 μl) was placed on glass slide and dried. The ring formed after drying the drop was shown to be composed of closely packed silver nanoparticles (FIG. 5). Such rings were shown to possess high electric conductivity (up to 15% of that for bulk silver) already at room temperature without any additional treatment (e.g. sintering).

While this invention has been shown and described with reference to preferred embodiments thereof, it will be understood by those skilled in the art that many alternatives, modifications and variations may be made thereto without departing from the spirit and scope of the invention. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference.

What is claimed is:

1. A method for preparing an aqueous-based dispersion of metal nanoparticles comprising:
    (a) providing an aqueous suspension of a metal salt;
    (b) pre-reducing said metal salt suspension by a water soluble polymer capable of metal reduction to form metal nuclei; and
    (c) adding a chemical reducer to form metal nanoparticles in dispersion.

2. The method of claim 1 further comprising at least one step of separating the nanoparticles obtained in step (c) from the aqueous medium of said dispersion and redispersing in a liquid to form a dispersion of nanoparticles.

3. The method of claim 2 wherein said separation is selected from centrifugation, decantation, filtration, ultrafiltration, and a combination thereof.

4. The method of claim 2, wherein said redispersing involves the addition of a suitable dispersing agent and optionally a wetting agent.

5. The method of claim 4 wherein said dispersing agent is selected from surfactants, water soluble polymers, and mixtures of any of the above.

6. The method of claim 5 wherein said water soluble polymer is a polyelectrolyte.

7. The method of claim 4 wherein said wetting agent is a surfactant.

8. The method of claim 2 wherein said liquid is an aqueous liquid.

9. The method of claim 2 wherein the concentration of said metal nanopraticles in said dispersion is in the range 5-80 wt %, based on the total weight of the dispersion.

10. The method of claim 1 further comprising at least one step of separating the nanoparticles obtained in step (c) from the aqueous medium of said dispersion followed by removal of water in order to obtain a powder of metallic particles.

11. The method of claim 1 wherein said step (b) includes incubation for a period of at least 5 minutes.

12. The method of claim 1, wherein step (b) is conducted at a temperature range of 20-100° C.

13. The method of claim 1, wherein step (c) is conducted at a temperature range of 20-100° C.

14. The method of claim 1 wherein said metal nanoparticles are selected from silver nanoparticles, gold nanoparticles, platinum nanoparticles, palladium nanoparticles, and a mixture of any of the above.

15. The method of claim 1 wherein said metal nanoparticles are silver nanoparticles.

16. The method of claim 1 wherein said metal salt have low water solubility.

17. The method of claim 1, wherein said metal salt have a solubility of up to 5% w/w at a temperature of 100° C.

18. The method of claim 1 wherein said metal salt is selected from silver acetate, silver sulfate, silver carbonate, and mixtures of any of the above.

19. The method of claim 1 wherein said metal salt is a metal acetate salt.

20. The method of claim 19 wherein said metal acetate salt is silver acetate.

21. The method of claim 1 wherein the content of said metal salt in said suspension is in the range of 1.0 to 50 wt %.

22. The method of claim 1 wherein the concentration of said metal nanopraticles in said dispersion is in the range 0.5-35 wt %, based on the total weight of the dispersion.

23. The method of claim 1 wherein the particle size of said nanoparticles is below 20 nm in diameter.

24. The method of claim 1 wherein said metal salt is silver acetate and said water soluble polymer is polypyrrole.

25. The method of claim 1 wherein the concentration of said water soluble polymer is in the range of 0.1-10 wt %.

26. The method of claim 1 wherein the weight ratio of said water soluble polymer to said metal is below 0.1:1.

27. The method of claim 1 wherein the weight ratio of said water soluble polymer to said metal is in the range 0.01:1-0.06:1.

28. The method of claim 1 wherein said chemical reducer is selected from tri-sodium citrate, ascorbic acid, di-sodium tartrate, hydrazine, sodium borohydride, and mixtures of any of the above.

29. The method of claim 1 further comprising adding a colorant to said dispersion.

30. The method according to claim 1 further comprising adding to said dispersion an additive selected from humectants, binders, surfactants, fungicides, rheology modifiers, pH adjusting agents, co-solvents, and mixtures thereof.

31. The method according to claim 1, further comprising a step of preparing an ink composition, a paint, or a coating.

32. The method according to claim 31 wherein said ink composition is for use in ink-jet printing.

33. The method according to claim 1, further comprising a step of forming a conductive pattern by deposition of said dispersion on a substrate and optionally followed by sintering.

34. The method according to claim 1 further comprising placing or jetting drops of the dispersion onto a substrate to obtain conductive rings.

35. The method according to claim 34 wherein said conductive rings have high electrical conductivity at room temperature.

36. The method according to claim 1 further comprising dispensing a plurality of drops of the dispersion onto a substrate to form arrays of conductive rings.

37. A method for preparing an aqueous-based dispersion of metal nanoparticles, comprising:
    (a) providing an aqueous suspension of a metal salt, wherein the concentration of the soluble metal salt in the suspension is below its saturation value;
    (b) pre-reducing said metal salt suspension by a water soluble polymer capable of metal reduction to form metal nuclei; and
    (c) adding a chemical reducer to form metal nanoparticles in dispersion.

* * * * *